Patented Apr. 2, 1935

1,996,070

UNITED STATES PATENT OFFICE 1,996,070

CONDENSATION PRODUCT AND PROCESS FOR PREPARING THE SAME

Herbert Hönel, Vienna, Austria, assignor to Beck, Koller & Company, Inc., Detroit, Mich., a corporation of Delaware No Drawing. Application February 11, 1932, Serial No. 592,434. In Austria August 6, 1927

28 Claims. (Cl. 260—4)

The invention relates to improvements in condensation products and the process of making the same.

The present application is a combination of my two prior applications Serial Nos. 506,296 and 506,297, both filed January 2, 1931, and contains no matter not disclosed in one or the other of these two prior applications, and the disclosures of both of my prior applications are to be considered as forming part of the disclosure of the present application. My prior application Serial No. 506,297 is a division of an earlier application, Serial No. 218,587, filed September 9, 1927, now Patent No. 1,800,295, dated April 14, 1931, while my application Serial No. 506,296 is a division of an earlier application, Serial No. 362,460, filed May 11, 1929, now Patent No. 1,800,296, dated April 14, 1931.

My prior application Serial No. 506,297 is primarily concerned with the production of condensation products by condensing an aldehyde with a phenol substituted in the para-position by a hydrocarbon radicle, while my application Serial No. 506,296 discloses the fact that certain ester-like bodies may be reacted with heat hardening condensation products formed from an excess of formaldehyde and a phenolic body which is substituted in any of the particularly reactive positions (which positions, as is well known, are the two ortho- and the para-positions to the hydroxyl group). Consequently, while in the following description phenols substituted in the para-position will be particularly referred to by way of example, it will be understood that the invention in its broadest aspects contemplates the use of phenols substituted in the para- or ortho-positions.

The invention starts with the discovery that by condensing aldehydes and phenols which are substituted in one of the particularly reactive positions by a higher saturated hydrocarbon radicle containing at least 3 carbon atoms even when formaldehyde in substantial excess over the equimolecular quantity is employed, condensation products can be obtained which are completely soluble in benzine, and are also compatible with oils and waxes, and possess highly valuable properties. Such phenols are, in part, easily prepared owing to the special reactivity of the p-hydrogen atom in the molecule; for example, by heating phenol with higher alcohols in the presence of dehydration agents such as anhydrous zinc chloride, magnesium chloride or primary alkali sulphates (see, inter alia, Ber. d. deutschen Chem. Ges. vol. 14, p. 1842 et seq., vol. 15, p. 150 et seq., vol. 16, p. 792, vol. 17, p. 669, vol. 26, p. 1646 and German Patent No. 17,311). They can also be prepared from phenol by reactive halides in presence of agents capable of splitting off halogen hydrides (see Ber. 15, p. 152; 32, p. 2428; German Patent 18,977). They can also be obtained with advantage in a circuitous manner, for example, from alkylated benzol through its sulphonic acid, or from the corresponding amide, under which conditions p-substituted phenols alone are obtained in nearly all cases.

A process for the production of resins is known and is set forth in German Patent No. 340,989 in which phenols are first condensed with unsaturated hydrocarbons, by the Koenigs method (Ber. vol. 23, p. 3145; vol. 24, p. 179 and 3889 and vol. 25, p. 2649), and then with aldehydes. The first condensation produces a mixture of different materials including some p-substituted phenols. Especially in the case of iso-amylenes, the resulting mixture contains only about 6% of the corresponding p-substituted phenol, the remainder comprising uncombined starting materials, together with ester-like compounds and polymerization products of the iso-amylene. The resins obtained by the above process are also soluble only in benzol, but insoluble in benzine. On the other hand, however, according to the present process, the p-butylphenol obtained from isobutylalcohol and phenol, for example, furnishes with formaldehyde—notwithstanding the smaller aliphatic radicle—a resin which is soluble in benzine in all proportions. As a matter of course, acetaldehyde, for example, furnishes with the same substance resin which is not less soluble in benzine. Also thymol, which contains the isopropyl group in the ortho-position, yields, when reacted with formaldehyde, condensation products showing good solubility in benzine. Particularly valuable materials are the purified phenols with a p-substituted tertiary radicle, since they furnish with aldehydes very pale resins which are fast to light. The starting materials may also consist of phenol mixtures such as crude cresol, it being advisable to take the proportion of phenol and m-cresol into consideration. In such case, the entire reaction mixture, together with the components (p-cresol in particular) which do not enter into the reaction, can be used in the condensation treatment, resins soluble in benzine being nevertheless obtained. The substances (alcohols, haloids, etc.) serving for the substitution of the p-hydrogen atom in the phenol may be used in an unrefined and mixed condition. The substituents may be purely aliphatic or hydroaromatic.

I have now found that the said p-substituted phenols behave in a very similar manner to p-cresol with regard to condensation with formaldehyde. They can be condensed at different temperatures in the presence of varying amounts of alkali, ammonia, etc. with varying amounts of formaldehyde. According to the conditions, oily to solid masses, clear resins or infusible products are obtained. Equimolecular amounts of formaldehyde, or even up to 2 molecules, can be taken up at lower temperatures. The method adopted in order to compound a proportion considerably exceeding the equimolecular one is to dissolve the phenol substance in alkalis and leave it in contact with aqueous formaldehyde at a moderate temperature for some time. Even considerably less than equimolecular proportions of alkali will suffice provided uniform solution of the components is effected. The reaction product is finally thrown down from the alkaline solution by means of any acid. The products obtained by this method can be hardened by the application of heat. When prepared with more than an equimolecular proportion of formaldehyde they become harder and more resistant than those prepared with only equivalent amounts. Such an excess of formaldehyde is also very useful for the purposes described hereinafter.

The slower rate of transition into the infusible state and other differences in behaviour as compared with the known similar products of the heat hardening type, enlarge the sphere of possible application. Thus, for example, the transition into the insoluble form when heated can be entirely prevented by a whole series of substances, even when operating with already viscous products prepared with an excess of formaldehyde, provided such substances be present in not too small amount. Such substances comprise all possible artificial and natural, acid neutral or neutralized resins, waxes, fatty oils, etc. The condensation products of this type prepared from common phenols can only be worked up with acidic resins (for example, colophony), while in the case of neutral stuffs it is impossible to work them up to obtain useful combination products.

In the present case the possibility of reacting my heat hardening condensation products with oils and waxes and of obtaining homogeneous reaction products thereby is not only due to their slower rate of resinification, which is to be explained by the substitution in one of the particularly reactive positions of the phenol, as hereinbefore mentioned, but also due to their specific solubility conditions. In contradiction thereto, condensation products of the heat hardening type derived from corresponding low phenol homologues in which also one of the particularly reactive positions is occupied, for example, paracresol di-alcohol, and which can usefully be reacted with neutral resins, cannot, however, be reacted with waxes. It has been found as a general preliminary condition for carrying out the reaction that the condensation product dissolves in the material to be treated at least at somewhat elevated temperatures before the reaction sets in.

This does not only refer to the condensation products obtained from para-substituted phenols, but also to those derived from phenols in which generally one of the particularly reactive positions (o-, o-, p-,) is occupied. Such condensation products are, as has been shown in my applications Serial No. 362,460 (now Patent No. 1,800,296) and Serial No. 506,296, generally adaptable to react with neutral ester-like bodies and to yield homogeneous reaction products. The compatibility with such bodies as are of a decidedly aliphatic nature, as oils and waxes, is effected by the use of a relatively high saturated hydrocarbon radicle as the substituent in the phenol; such compatibility goes hand in hand with the solubility of the condensation products in aliphatic hydrocarbons such as benzine.

While in the aforementioned Patent No. 1,800,296, this reaction was claimed as applicable generally to ester-like bodies, the present application is particularly concerned with the reaction of certain higher molecular esters which will hereinafter be called wax-like esters or bodies, under which term is included waxes and tallows. Esters of this type are well-known in the art and are probably microcrystalline in character.

More particularly the present application is concerned with the reaction of (1) a condensation product of the heat hardening type obtained by condensing together an excess of formaldehyde with a phenol substituted in one of the reaction favorable positions (o-, o-, p-,) by a higher saturated hydrocarbon radicle containing at least three carbon atoms and (2) a multiple proportion of a wax-like body belonging to the class of waxes and tallows hereinbefore mentioned. The product of such reaction is a homogeneous artificial mass having a substantially higher viscosity than the said wax-like body before entering the reaction. Hand in hand with that change goes an increase in hardness of the solidified product which considerably improves the technical properties of the material and which may also become apparent by a raised melting point.

Even with fairly small amounts of the suitable heat hardening condensation products, wax-like bodies as is the case with other neutral substances undergo highly valuable modifications of their physical and chemical properties, such as hardness, viscosity, resistance to external influences, etc. In some cases also the melting point is considerably increased.

It should be noted that it is very important in preparing the condensation products that there should be present no unsubstituted phenol (hydroxy-benzol) or meta-cresol. Where even a very small quantity of unsubstituted phenol or meta-cresol is present, the condensation product obtained cannot be reacted with neutral ester-like stuffs including micro-crystalline wax-like bodies, owing to the formation of useless sago-like infusible and insoluble masses within the melt.

For the sake of completeness it may be mentioned that when condensing formaldehyde with the hereinbefore-mentioned substituted phenols by the aid of an acid catalyst, very pale, hard, up to almost infusible resins may be produced, provided a sufficient amount of formaldehyde be used. The resins obtained are likewise compatible with drying oils and the wax-like bodies hereinbefore mentioned. As, however, no reaction takes place when melting together these wax-like bodies and the condensation products produced by the acid method, the melt obtained mainly constitutes a mixture of the two components and no increase of hardness or any other improvement can be observed during the melting process, even when heated at high temperatures.

*Example 1*

82 grms. of p-tertiary-amylphenol (prepared, for example, from equimolecular proportions of phenol and tertiary amyl chloride, with a little AlCl₃) are dissolved to a clear solution in 90 grms. of 30% formaldehyde and 75 cc. of 3n-NaOH, by gentle warming. The charge is maintained at 50–55° C. for about 24 hours, and the viscous oily reaction product is precipitated by any acid, separated from the supernatant aqueous liquid and dried in the water bath. When placed in moulds it can be transformed, under pressure (in autoclaves), into a very hard, infusible resin. Before and after this treatment it is extremely fast to light.

Example 2

75 grms. of p-tertiary-butylphenol are condensed for several hours at 100° C. with 50 grms. of 30% formaldehyde and 7.5 grms. of concentrated ammonia, until a clear, viscous resin has been formed, which can easily be separated from the aqueous liquid. It is of a pale lemon-yellow color, and is soluble in benzine and the like in all proportions. On being heated, it passes over into the infusible and insoluble form.

Example 3

20 grms. of the still moist product obtained as in Example 1 are gradually introduced into 100 grms. of fused purified Montan wax, the temperature being finally raised to 200° C. The resulting wax-like product has a considerably higher melting point than the Montan wax itself and is also much tougher and harder, and shows under equal conditions a much higher viscosity.

Example 4

6 parts of melissic palmitate (beeswax) are melted and stirred up with the liquid condensation product obtained from one part of p-tertiary-amylphenol and one part of 30% formaldehyde. The temperature is then gradually raised to 240° C. The brown end product shows characteristic properties which differ from those of the beeswax itself. It is harder, more easily polished, more plastic and in thin layers more transparent and when poured out in thin plates is elastically pliable. When poured onto a smooth surface it displays considerable adhesive powers. In general the colloidal properties of the product are considerably increased, and the product itself to a certain extent assumes resin-like properties.

Example 5

4 parts of melted beef tallow are stirred up with the viscous condensation product resulting from 1 part of p-tertiary-butyl-m-cresol and 1 part of formaldehyde 40% by volume gradually heated up to 190° C. and maintained for 1–1½ hours at this temperature. The end product has the character of a very viscous oil and only sets when cooled with ice to a lard-like mass.

In order to illustrate the solubility conditions of a resin obtained by condensing formaldehyde with a substituted phenol by the aid of an acid catalyst the following example may be added:

Example 6

150 grms. of p-tertiary-butylphenol, prepared according to the Liebmann method (Ber. 14, p. 1842 and 15, p. 150) from isobutyl alcohol, phenol and zinc chloride, or in any other way, are heated to boiling with 95 grms. of 30% formaldehyde, in presence of 10 grms. of concentrated hydrochloric acid, for 8–10 hours under a reflex condenser. Finally, the aqueous liquid is separated from the condensation product (which is already almost solid at boiling temperature), and the latter is dehydrated by heating. A nearly water-white resin is obtained, of high melting point, very fast to light, and soluble in benzine and the like in any proportion.

This product is also compatible with fats, fatty oils and waxes.

What I claim is:

1. A homogeneous artifical mass obtained by reacting an excess of a wax-like ester which is a member of the group consisting of waxes and tallows, with a condensation product obtained by condensing together formaldehyde and a phenol substituted in a particularly reactive position by a saturated hydrocarbon radicle containing at least three carbon atoms, the final mass having a substantially higher viscosity than the wax-like ester.

2. A process of producing homogeneous artificial masses which comprises reacting an excess of a wax-like ester which is a member of the group consisting of waxes and tallows, with a condensation product obtained by condensing together formaldehyde and a phenol substituted in a particularly reactive position by a saturated hydrocarbon radicle containing at least three carbon atoms.

3. A homogeneous artificial mass obtained by reacting an excess of a wax-like ester which is a member of the group consisting of waxes and tallows, with a smaller quantity of a condensation product of the heat-hardening type obtained by condensing, with the aid of an alkali, an excess of formaldehyde and a phenol substituted in a particularly reactive position by a saturated hydrocarbon radicle containing at least three carbon atoms, the final mass having a substantially higher viscosity than the wax-like ester.

4. A process of producing homogeneous artificial masses which comprises reacting an excess of a wax-like ester which is a member of the group consisting of waxes and tallows, with a smaller quantity of a condensation product of the heat-hardening type obtained by condensing, with the aid of an alkali, an excess of formaldehyde and a phenol substituted in a particularly reactive position by a saturated hydrocarbon radicle containing at least three carbon atoms.

5. A process which comprises reacting an excess of a wax-like ester which is a member of a group consisting of waxes and tallow with a smaller quantity of a condensation product obtained by condensing together, in the presence of an alkali, an aldehyde and a phenol substituted in the ortho- or para-position by a saturated hydrocarbon radicle containing not less than four carbon atoms.

6. A process which comprises reacting an excess of a wax with a smaller quantity of a condensation product obtained by condensing together, in the presence of an alkali, an aldehyde and a phenol substituted in the para-position by a saturated hydrocarbon radicle containing not less than four carbon atoms.

7. A process which comprises reacting an excess of Montan wax with a smaller quantity of a condensation product obtained by condensing together, in the presence of an alkali, an aldehyde and a phenol substituted in the para-position by a saturated hydrocarbon radicle containing not less than four carbon atoms.

8. A process which comprises reacting an excess of bees wax with a smaller quantity of a condensation product obtained by condensing together, in the presence of an alkali, an aldehyde and a phenol substituted in a particularly reactive position by a hydrocarbon radicle containing not less than four carbon atoms.

9. A process for the production of condensation products which comprises reacting an excess of Montan wax with a smaller quantity of a viscous product obtained by condensing a para-tertiary-alkylphenol with formaldehyde in the presence of an alkali.

10. A process for the production of soluble artificial masses which comprises reacting an excess of melissic palmitate with a smaller quantity of a liquid product obtained by condensing together p-tertiary-amylphenol and formaldehyde.

11. A process for the production of soluble artificial masses which comprises reacting an excess of melted beef tallow with a smaller quantity of a viscous product obtained by condensing together p-tertiary-butyl-m-cresol and formaldehyde.

12. A process for the production of condensation products which comprises reacting an excess of a wax-like ester which is a member of a group consisting of waxes and tallow with a smaller quantity of a product obtained by condensing a para-tertiary alkyl phenol with an aldehyde.

13. A homogeneous artificial mass obtained by reacting an excess of a wax-like ester which is a member of a group consisting of waxes and tallow with a smaller quantity of a condensation product obtained by condensing together, in the presence of an alkali, an aldehyde and a phenol substituted in the ortho- or para-position by a saturated hydrocarbon radicle containing not less than four carbon atoms, the final reaction product having a higher melting point than the crystalline ester.

14. A homogeneous artificial mass obtained by reacting an excess of a wax with a smaller quantity of a condensation product obtained by condensing together, in the presence of an alkali, an aldehyde and a phenol substituted in the para-position by a saturated hydrocarbon radicle containing not less than four carbon atoms, the final reaction product having a higher melting point than the wax.

15. A homogeneous artificial mass obtained by reacting an excess of Montan wax with a smaller quantity of a condensation product obtained by condensing together, in the presence of an alkali, an aldehyde and a phenol substituted in the para-position by a saturated hydrocarbon radicle containing not less than four carbon atoms, the final reaction product having a higher melting point than the wax.

16. A homogeneous artificial mass obtained by reacting an excess of bees wax with a smaller quantity of a condensation product obtained by condensing together, in the presence of an alkali, an aldehyde and a phenol substituted in a particularly reactive position by a hydrocarbon radicle containing not less than four carbon atoms, the final reaction product having a higher melting point than the wax.

17. A homogeneous artificial mass obtained by reacting an excess of Montan wax with a smaller quantity of a viscous product obtained by condensing a para-tertiary alkyl phenol with formaldehyde in the presence of an alkali, the final reaction product having a higher melting point than the wax.

18. A homogeneous artificial mass obtained by reacting an excess of melissic palmitate with a smaller quantity of a liquid product obtained by condensing together p-tertiary-amylphenol and formaldehyde, the final reaction product having a higher melting point than the melissic palmitate.

19. A homogeneous artificial mass obtained by reacting an exces of melted beef tallow with a smaller quantity of a viscous product obtained by condensing together p-tertiary-butyl-m-cresol and formaldehyde, the final homogeneous mass having a higher melting point than the tallow.

20. A homogeneous artificial mass obtained by reacting an excess of a wax-like ester which is a member of a group consisting of waxes and tallow with a smaller quantity of a product obtained by condensing a para-tertiary alkyl phenol with an aldehyde, the final homogeneous mass having a higher melting point than the crystalline ester.

21. A process for the production of condensation products which comprises reacting an excess of Montan wax with a smaller quantity of a viscous product obtained by condensing a para-tertiary-alkylphenol with an excess of formaldehyde over the equimolecular quantity in the presence of an alkali.

22. A process for the production of soluble artificial masses which comprises reacting an excess of melissic palmitate with a smaller quantity of a liquid product obtained by condensing together p-tertiary-amylphenol and an excess of formaldehyde over the equimolecular quantity.

23. A process for the production of soluble artificial masses which comprises reacting an excess of melted beef tallow with a smaller quantity of a viscous product obtained by condensing together p-tertiary-butyl-m-cresol and an excess of formaldehyde over the equimolecular quantity.

24. A process for the production of condensation products which comprises reacting an excess of a wax-like ester which is a member of a group consisting of waxes and tallow with a smaller quantity of a product obtained by condensing a para-tertiary alkyl phenol with an excess of formaldehyde over the equimolecular quantity.

25. A homogeneous artificial mass obtained by reacting an excess of Montan wax with a smaller quantity of a viscous product obtained by condensing a para-tertiary alkyl phenol with an excess of formaldehyde over the equimolecular quantity, in the presence of an alkali, the final reaction product having a higher melting point than the wax.

26. A homogeneous artificial mass obtained by reacting an excess of melissic palmitate with a smaller quantity of a liquid product obtained by condensing together p-tertiary-amylphenol and an excess of formaldehyde over the equimolecular quantity, the final reaction product having a higher melting point than the melissic palmitate.

27. A homogeneous artificial mass obtained by reacting an excess of melted beef tallow with a smaller quantity of a viscous product obtained by condensing together p-tertiary-butyl-m-cresol and an excess of formaldehyde over the equimolecular quantity, the final homogeneous mass having a higher melting point than the tallow.

28. A homogeneous artificial mass obtained by reacting an excess of a wax-like ester which is a member of a group consisting of waxes and tallow with a smaller quantity of a product obtained by condensing a para-tertiary alkyl phenol with an excess of formaldehyde over the equimolecular quantity, the final homogeneous mass having a higher melting point than the wax-like ester.

HERBERT HÖNEL.